United States Patent [19]

Tanaka et al.

[11] Patent Number: 4,657,994
[45] Date of Patent: Apr. 14, 1987

[54] PROCESS FOR CONTINUOUS PRODUCTION OF ETHYLENE-VINYL ACETATE COPOLYMER

[75] Inventors: Junsuke Tanaka, Ikeda; Kenji Matsumoto, Okayama, both of Japan

[73] Assignee: Kuraray Co., Ltd., Kurashiki, Japan

[21] Appl. No.: 816,950

[22] Filed: Jan. 6, 1986

Related U.S. Application Data

[63] Continuation of Ser. No. 646,367, Aug. 30, 1984, abandoned.

[30] Foreign Application Priority Data

Sep. 1, 1983 [JP] Japan ................... 58-161291

[51] Int. Cl.[4] .................... C08F 2/06; C08F 218/08
[52] U.S. Cl. ................................ 526/68; 526/67; 526/87; 526/219.6; 526/227; 526/331; 422/138
[58] Field of Search ............... 526/68, 71, 87, 331, 526/67, 219.6, 227; 422/138

[56] References Cited

U.S. PATENT DOCUMENTS

| | | |
|---|---|---|
| 3,891,603 | 6/1975 | Heil et al. ................. 526/68 |
| 4,024,329 | 5/1977 | Lauer et al. ............... 526/68 X |
| 4,091,200 | 5/1978 | Vandegaer ................. 526/68 X |
| 4,282,339 | 8/1981 | Donaldson et al. ......... 526/68 X |
| 4,408,024 | 10/1983 | Matsuyama et al. ........ 422/138 X |
| 4,442,271 | 4/1984 | Rau et al. ................. 526/68 X |
| 4,485,225 | 11/1984 | Satoh et al. .............. 526/331 |

Primary Examiner—Joseph L. Schofer
Assistant Examiner—F. M. Teskin
Attorney, Agent, or Firm—Kramer and Brufsky

[57] ABSTRACT

An improved process for continuously producing ethylene-vinyl acetate copolymer containing 20 to 50 mole % of ethylene is provided. An aliphatic alcohol solvent is employed in the polymerization vessel. Ethylene vapor discharged from the polymerization vessel is introduced into the tubes of the lower part of a multi-tubular heat exchanger. Vinyl acetate is introduced into the upper part of the heat exchanger and caused to flow through said tubes, thereby effecting absorption and solubilization of ethylene into the vinyl acetate. The solubilized ethylene and vinyl acetate is passed to the polymerization vessel. The process of this invention permits the stable production of the copolymer over a long period of time.

6 Claims, 1 Drawing Figure

PROCESS FOR CONTINUOUS PRODUCTION OF ETHYLENE-VINYL ACETATE COPOLYMER

This application is a continuation of application Ser. No. 646,367, filed Aug. 30, 1984, now abandoned.

BACKGROUND OF THE INVENTION

1. Field of the Invention

The present invention relates to a process for producing ethylene-vinyl acetate copolymer continuously in a very stable manner over a long period of time.

2. Description of the Prior Art

Much has been studied so far of the technology that permits stable production of ethylene-vinyl acetate copolymer over a long period of time; but no satisfactory method has, as yet, been found. The key to the stable continuous operation is how to remove a large amount of reaction heat generated during the copolymerization of ethylene and vinyl acetate. There are several means for removing the reaction heat. In one method, reaction heat is removed by means of the jacket and coil provided on and in the polymerization vessel. In another method, reaction heat is removed by circulating the reaction liquid through a cooler installed outside the vessel. In a further method, reaction heat is removed by introducing ethylene gas, which is present in the upper space of the vessel, into a cooler installed outside the vessel, and returning the cooled or condensed ethylene to the vessel. These methods, however, have the following drawbacks:

(1) Drawbacks involved in the method of removing reaction heat by means of the jacket and coil attached to the polymerization vessel.

(a) With the lapse of operation time, polymer deposits on the surfaces of the jacket and coil, reducing their capability of heat conduction. To continue operation, the polymer deposit has to be washed out from the jacket and coil. This requires periodic shut-down.

(b) The flow of the reaction liquid is inevitably poor in the space between the pipes of the coil and the space between the coil and the vessel wall. This leads to the formation of gel and lumps that adversely affects the quality of the resulting polymer.

(2) Drawbacks involved in the method of removing reaction heat by means of the circulating cooler for the reaction liquid.

(a) As with the above case, polymer deposits on the heat transfer area of the circulating cooler with the lapse of operation time, reducing the capability of heat conduction. To continue operation, it is necessary to remove the polymer deposit or to install the cooler in duplicate for alternate use. The former requires periodic shut-down.

(b) Since the reaction solution is highly viscous, circulation thereof causes a great deal of pressure loss. Cooling by the evolution of sensible heat requires the circulation of a large amount of reaction solution. This leads to the consumption of a large amount of pumping energy. Pumping under high pressure often causes leakage from the seal. The leaked solution releases ethylene gas and solidifies on the equipment, entailing a danger and creating a difficulty in equipment maintenance.

(c) The high viscosity of the reaction solution makes it difficult to increase the flow rate, and the low thermal conductivity of the reaction solution requires the cooler to have a large heat transfer area.

(d) No coolers achieve complete piston flow because of the structure, and the hold-up in the dead space is inevitable where gel and lumps detrimental to the quality are formed.

(3) Drawbacks involved in removing reaction heat by cooling and condensing ethylene gas.

(a) The condensing temperature of ethylene is low (particularly when the pressure is low) and the condensation of ethylene is only possible by the aid of a cooling medium at an extremely low temperature.

(b) Since ethylene gas to be cooled has only a small amount of sensible heat, it is necessary to circulate a large amount of ethylene gas by using a booster.

(c) The condensation of ethylene is impossible to perform under a pressure higher than that (50.5 atm) at the critical point.

(d) As the state of ethylene approaches the critical point, the difference in enthalpy and density becomes small between gaseous ethylene and liquefied ethylene. This makes the condensing operation difficult.

SUMMARY OF THE INVENTION

It is an object of this invention to provide a process for continuous production of ethylene-vinyl acetate copolymer which is free of the above-mentioned drawbacks.

The present invention provides an improved process for continuously producing ethylene-vinyl acetate copolymer containing 20 to 50 mole % of ethylene by introducing ethylene, vinyl acetate, solvent, and polymerization catalyst into a polymerization vessel, wherein the improvement comprises the steps of:

(1) passing vinyl acetate or a solvent solution of vinyl acetate through a heat exchanger provided with a cooling means, and simultaneously passing ethylene discharged from the polymerization vessel through said heat exchanger, so that they come into contact with each other in said heat exchanger, thereby causing the vinyl acetate or the solvent solution of vinyl acetate to absorb and solubilize ethylene, (2) introducing the vinyl acetate or the solvent solution of vinyl acetate which has absorbed and solubilized ethylene therein into the polymerization vessel, (3) mixing in the polymerization vessel, the vinyl acetate or the solvent solution of vinyl acetate which has absorbed and solubilized ethylene therein with the polymerization solution, heating the polymerization solution to the polymerization temperature, during which ethylene from the vinyl acetate or the solvent solution of vinyl acetate is vaporized by the aid of the heat in the polymerization vessel, and circulating the vaporized ethylene to the heat exchanger.

The process of this invention produces the beneficial effects mentioned below.

(a) Since the heat transfer surface of the heat exchanger does not come into contact with the polymer, it does not suffer from a decrease of heat conduction capability due to polymer deposit. This permits the stable production of ethylene-vinyl acetate copolymer over a long period of time.

(b) It is not necessary to install a cooling coil in the polymerization vessel, or a small one is sufficient, if any. This eliminates or minimizes the dead space in which gel and lumps are liable to occur.

(c) The heat exchanger can be of any size as required. Thus it is possible to employ a polymerization vessel of large size.

(d) The difference in the densities of liquid and gas can be utilized for circulation. This obviates the installation of pumps and boosters, making the facilities simpler.

(e) The process involves both condensation and solution; in other words, the process utilizes both heat of condensation and heat of solution. Thus there is a great difference between the enthalpy of gaseous ethylene and the enthalpy of liquid ethylene. This makes it possible to reduce the quantity of ethylene for circulation.

(f) The critical point (both pressure and temperature) of ethylene in the two-component system of ethylene and vinyl acetate is higher than that in the system of ethylene alone. This provides a broad operating range for condensing ethylene and permits the use of a coolant at a high temperature. In addition, there is a great difference between the enthalpy of gaseous ethylene and the enthalpy of liquid ethylene. This makes it possible to reduce the quantity of ethylene for circulation.

DETAILED DESCRIPTION OF THE PREFERRED EMBODIMENT

Figure 1:
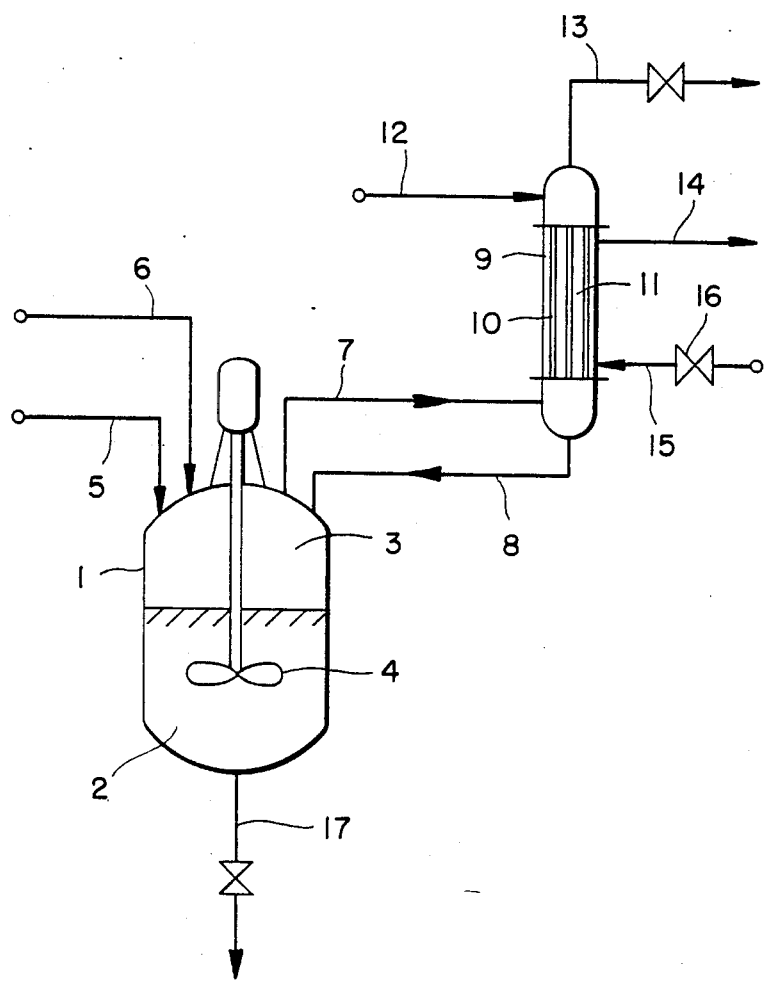
FIG. 1 is a schematic drawing illustrating the process of this invention and an example of the apparatus used in this invention.

The preferred heat exchanger to be used in this invention is a vertical wetted-wall heat exchanger, particularly a vertical wetted-wall multi-tubular heat exchanger. It also includes those which have a large surface area, such a structure that permits absorption of ethylene gas, and an ability to transfer heat rapidly. Examples of such heat exchangers include one which is made up of an absorber of packed column type, perforated plate type, or bubble cap tower type, and a jacket, and/or a coil.

As mentioned above, vinyl acetate or a solvent solution of vinyl acetate (referred to as simply vinyl acetate hereinafter) and ethylene are passed through the heat exchanger equipped with a cooling means, in which vinyl acetate and ethylene come into contact with each other and ethylene is absorbed by and solubilized in vinyl acetate, and the heat of condensation and the heat of solution are removed. Thus, vinyl acetate is allowed to flow in the form of a thin film along the inside of the tube of the vertical wetted-wall multi-tubular heat exchanger, and simultaneously ethylene gas is passed through the tube so that ethylene is absorbed by and solubilized in vinyl acetate. The heat of condensation and the heat of solution are removed by the coolant flowing outside the tube.

Vinyl acetate should be fed to the heat exchanger as much as necessary for the amount of heat to be removed. Thus it is possible to feed a part of the vinyl acetate directly to the polymerization vessel. Also, a part of the solvent may be used for dissolving the polymerization catalyst, and vinyl acetate may be fed into the polymerization vessel together with the polymerization catalyst.

The vinyl acetate which has absorbed ethylene (referred to as absorption liquid hereinafter) should be cooled to a temperature $T_1$ in the range of $-20°$ C.$\leq T_1 < T_2$, preferably $-10°$ C.$\leq T_1 \leq T_2 - 10°$ C., wherein $T_2$ is the polymerization temperature, before being introduced into the polymerization vessel. If $T_1$ is higher than $T_2$, heat removal is not achieved in the polymerization vessel. The process of this invention is effective only when a proper temperature is chosen so that ethylene gas condenses. Thus $T_1$ should be above the temperature at which gaseous ethylene and liquid ethylene can coexist under a certain polymerization pressure. In other words, $T_1$ should be above the temperature at which the saturated vapor pressure of ethylene coincides with the polymerization pressure of ethylene. For example, $T_1$ should be above $-28°$ C. if the polymerization pressure is 20 kg/cm$^2$G, and above 0° C. at 40 kg/cm$^2$G. In consideration of the fluctuations that will occur in the actual operation, the temperature should be set up with some tolerance. Thus in the process of this invention, $T_1$ should be above $-20°$ C., and preferably above $-10°$ C. for the polymerization pressure in the range of 20 to 70 kg/cm$^2$G. In the meantime, it is known that the critical pressure of ethylene is 50.5 atm, and it is higher than this when ethylene coexists with vinyl acetate. And it has been confirmed that there is a region in which both gas and liquid coexist under the polymerization pressure of 70 kg/cm$^2$G employed in this invention. The $T_1$ for the absorption liquid is determined according to the amount of heat to be removed and the polymerization pressure. As the polymerization pressure increases, the lower limit of $T_1$ becomes high, and consequently the amount of heat that can be removed decreases accordingly.

The solvent used in this invention includes lower aliphatic alcohols containing from 1 to 4 carbon atoms; and industrially preferable among them is methanol. Where a copolymer of high degree of polymerization is to be obtained, tertiary butanol or a mixture of tertiary butanol and methanol is preferable.

The absorption liquid is introduced into the polymerization vessel in which it is mixed with the polymerization solution. While the absorption liquid is heated to the prescribed polymerization temperature by reaction heat, ethylene in excess of solubility is vaporized from the absorption liquid, and the vaporized ethylene is returned to the heat exchanger in which it is absorbed by and solubilized in vinyl acetate. Thus the cycle of the absorption and solubilization of ethylene in the heat exchanger and the vaporization of ethylene in the polymerization vessel is completed for the removal of reaction heat from the polymerization system. This is what produces the above-mentioned beneficial effects of this invention.

The polymerization temperature $T_2$ should preferably be lower than 80° C., because as it goes up, the resulting ethylene-vinyl acetate is low in the degree of polymerization. Although the polymerization temperature should preferably be low from the standpoint of the degree of polymerization, it should be higher than 35° C. because the rate of polymerization decreases as the polymerization temperature goes down. The preferred polymerization temperature is 40° to 70° C.

The polymerization temperature and the amount of heat to be removed can be properly adjusted by controlling the temperature of the polymerization solution, the temperature of the absorption liquid to be introduced into the polymerization vessel, and the temperature and volume of the coolant.

The solvent in the polymerization vessel should be used in as small a quantity as possible if it is desirable to obtain ethylene-vinyl acetate copolymer having a comparatively high degree of polymerization which is suitable for molding. The quantity of solvent should preferably be 1 to 30 wt % (based on the total liquid), and more preferably 1 to 20 wt %.

The polymerization process of this invention may be accomplished by the use of a single vessel or two or more vessels connected in series.

The polymerization pressure is determined according to how much ethylene should be contained in the resulting ethylene-vinyl acetate copolymer. In this invention, it is 20 to 70 kg/cm$^2$G since the invention is designed to give ethylene-vinyl acetate copolymers containing 20 to 50 mole % of ethylene. In the polymerization of the desired ethylene-vinyl acetate copolymer, it is essential that dissolved ethylene is present in the solvent solution of vinyl acetate in the polymerization vessel. The ethylene concentration should be higher as the desired ethylene content in ethylene-vinyl acetate copolymer is higher. This means that high pressure is required for the production of copolymers of high ethylene content, and low pressure for copolymers of low ethylene content.

Almost any kind of radical polymerization initiator can be used as the polymerization catalyst in the process of this invention. Preferred examples include azo compounds such as 2,2'-azobis-(4-methoxy-2,4-dimethyvaleronitrile), 2,2'-azobis-(2,4-dimethylvaleronitrile), and 2,2'-azobisisobutylonitrile; alkyl peresters such as t-butyl perpivalate; peroxy dicarbonates such as bis-(4-t-butyl-cyclohexyl)peroxy-di-carbonate and dicyclohexyl peroxy-di-carbonate; and peroxides such as dilauroyl peroxide. The polymerization catalyst may be charged in the form of a solution in a part of the solvent to be charged into the vessel.

Although the invention is intended to produce mainly ethylene-vinyl acetate copolymers, it permits the production of copolymers containing a third component. The third component is a copolymerizable comonomer, preferred examples of which include olefins such as propylene and isobutylene; unsaturated acids or esters thereof such as crotonic acid, acrylic acid, methacrylic acid, and maleic acid; and vinyl esters other than vinyl acetate such as vinyl propionate and vinyl ester of versatic acid. The content of the third component in the copolymer is less than 10 mole %. The third component may be introduced into the vessel together with ethylene or the solvent solution of vinyl acetate, if soluble therein.

The invention is now described with reference to the accompanying drawing illustrating the process of this invention and an example of the apparatus employed in this invention.

Ethylene gas under a prescribed pressure is introduced into the vessel (1) through the line (5). Simultaneously, a polymerization catalyst or a solution of polymerization catalyst (referred to as catalyst solution hereinafter) is introduced into the vessel (1) through the line (6). Ethylene gas may be introduced into the vessel (1) by means other than the line (5), that is, through the lower part of the below-mentioned heat exchanger (9), or through the connecting line (7) or (8) installed between the vessel (1) and the heat exchanger (9). Further catalyst solution may be introduced into the vessel (1) through another connecting line (8) as opposed to inlet line (6).

On the other hand, vinyl acetate is introduced into the vertical wetted-wall multi-tubular heat exchanger (9) through the line (12). The vinyl acetate is allowed to flow in the form of a thin film along the inside of the tube (10). Ethylene gas present in the space (3) of the vessel (1) is introduced into the heat exchanger (9) through the line (7). The ethylene gas rises through the tube (10) countercurrently to and in contact with vinyl acetate. Thus, the ethylene gas is absorbed in and solubilized in vinyl acetate, preferably to saturation. If necessary, a part of vinyl acetate may be introduced directly into the vessel (1).

The coolant is introduced into the heat exchanger (9) through the line (15). The coolant is allowed to flow through the space (11) outside the tube (10), so that it removes the heat of condensation and solution of ethylene which is generated as ethylene is absorbed by and solubilized in vinyl acetate. The coolant is discharged from the outlet (14). Inert gases are discharged from the top of the heat exchanger (9) through the line (13).

The vinyl acetate which has absorbed ethylene and has been cooled in the heat exchanger (9) is introduced into the vessel (1) through the line (8). (The line (7) and the line (8) may be combined to form a single line.) The vinyl acetate (absorption liquid) introduced into the vessel is mixed with the polymerization solution (2) and heated to the prescribed polymerization temperature. During the heating, the absorption liquid vaporizes ethylene dissolved in excess of the solubility in vinyl acetate. The vaporized ethylene is circulated again to the heat exchanger through the line (7).

The polymerization temperature is adjusted by controlling the temperature of the absorption liquid to be introduced from the heat exchanger (9) into the polymerization vessel (1) through the line (8). The temperature of the absorption liquid is adjusted by controlling the valve (16) for the coolant to be introduced into the heat exchanger (9).

The polymerization vessel (1) is installed with a stirrer (4). The solution polymerization is carried out for a prescribed period of time, and the resulting polymerization reaction mixture is discharged through the line (17). Ethylene-vinyl acetate copolymer is separated from the polymerization reaction mixture. The copolymer thus obtained may be saponified in the usual way with a caustic alkali (e.g. caustic soda) or an alkali metal alcoholate (e.g. sodium methylate) catalyst in a solvent, and the saponified product may be molded into various forms.

As mentioned above, the process of this invention makes it possible to produce ethylene-vinyl acetate copolymer continuously over a long period of time without the deposit of polymer and the formation of gel in the polymerization vessel. As demonstrated in the following examples, continuous operation over 90 days is possible when the process of this invention is employed, whereas the conventional process requires shutdown for cleaning every ten days. Thus the present invention is of great industrial significance.

The invention is now described in more detail with reference to the non-limitative examples and comparative examples that follow.

EXAMPLES 1 TO 3

Ethylene-vinyl acetate copolymer was produced continuously by using an apparatus shown in FIG. 1. The polymerization vessel has a volume of 660 liters, and the heat exchanger has a heat transfer area of 3 m$^2$ and 8 tubes. The polymerization vessel has no coil therein, so that the removal of heat is accomplished by the heat exchanger. The solvent was methanol and the coolant was a 30 wt % aqueous solution of methanol. The polymerization conditions and the results are shown in Table 1.

TABLE 1

| Items | Unit | Example 1 | Example 2 | Example 3 |
| --- | --- | --- | --- | --- |
| Polymerization pressure | kg/cm$^2$ G | 40 | 38 | 57 |
| Polymerization temperature $T_2$ | °C. | 55 | 50 | 55 |
| Feed of ethylene | kg/hr | 5.2 | 8.2 | 14 |
| Feed of vinyl acetate | kg/hr | 27 | 43 | 34 |
| Composition: | | | | |
| Vinyl acetate | wt % | 100 | 88 | 100 |
| Methanol | wt % | 0 | 12 | 0 |
| Feed of absorption liquid | kg/hr | 107 | 117 | 130 |
| Composition: | | | | |
| Vinyl acetate | wt % | 25 | 32 | 26 |
| Methanol | wt % | 0 | 5 | 0 |
| Ethylene | wt % | 75 | 63 | 74 |
| Methanol directly fed to vessel | kg/hr | 2.0 | 1.3 | 4.5 |
| Polymerization catalyst | | Note 1 | Note 1 | Note 2 |
| Temperature $T_1$ of absorption liquid | °C. | 3.0 | 7.0 | 28 |
| Polymerization reaction mixture | | | | |
| Discharge rate | kg/hr | 34 | 53 | 53 |
| Composition: | | | | |
| Copolymer | wt % | 45 | 25 | 20 |
| Vinyl acetate | wt % | 40 | 50 | 50 |
| Ethylene | wt % | 9 | 12 | 22 |
| Methanol | wt % | 6 | 13 | 8 |
| Circulation of coolant | m$^3$/hr | 1.5 | 1.8 | 1.6 |
| Temperature of incoming coolant | °C. | −3.0 | −2.5 | −3.0 |
| Amount of heat removed by heat exchanger | kcal/hr | 5770 | 5330 | 5270 |
| Number of days of continuous operation | days | 90 | 92 | 100 |
| Content of ethylene in copolymer | mol % | 30 | 29 | 40 |

Note 1: 2,2'-azobisisobutyronitrile
Note 2: t-butyl perpivalate

It is to be noted from Table 1 that in the examples continuous operation for more than 90 days was carried out according to the process of this invention. The inspection after shut-down revealed that there was almost no polymer deposits on the walls of the vessel and the shaft of the stirrer. Almost no gel was found in the resulting ethylenevinyl acetate copolymer.

COMPARATIVE EXAMPLES 1 TO 3

Continuous polymerization was carried out under the same conditions as in Examples 1 to 3, except that the vertical wetted-wall multi-tubular heat exchanger was not used but the polymerization vessel was provided with a jacket and coil. The volume of the vessel was 600 liters, and the heat transfer area of the jacket and coil was 3 m$^2$. The removal of heat was accomplished by circulating a fixed amount of water through the jacket and coil and replenishing water at a proper flow rate in accordance with the amount of heat to be removed. Excess water was discharged by overflowing. The results are shown in Table 2.

TABLE 2

| Items | Unit | Comparative Example 1 | Comparative Example 2 | Comparative Example 3 |
| --- | --- | --- | --- | --- |
| Polymerization pressure | kg/cm$^2$ G | 40 | 38 | 57 |
| Polymerization temperature $T_2$ | °C. | 55 | 50 | 55 |
| Feed of ethylene | kg/hr | 5.2 | 8.2 | 14 |
| Feed of vinyl acetate | kg/hr | 27 | 38 | 34 |
| Feed of methanol | kg/hr | 2 | 7 | 5 |
| Polymerization catalyst | | Note 1 | Note 1 | Note 2 |
| Polymerization reaction mixture | | | | |
| Discharge rate | kg/hr | 34 | 53 | 53 |
| Composition: | | | | |
| Copolymer | wt % | 45 | 25 | 20 |
| Vinyl acetate | wt % | 40 | 50 | 50 |
| Ethylene | wt % | 9 | 12 | 22 |
| Methanol | wt % | 6 | 13 | 8 |
| Temperature of replenishing coolant | °C. | 28 | 22 | 25 |
| Average temperature of fed and discharged coolant** | °C. | 45 → 35 | 42 → 25 | 45 → 35 |
| Number of days of continuous operation | days | 10 | 11 | 11 |
| Amount of heat removed by heat exchanger | kcal/hr | 5750 | 5300 | 5250 |

Note 1: 2,2'-azobisisobutyronitrile
Note 2: t-butyl perpivalate
**This indicates that the temperature of the coolant was lowered as the duration of operation was extended.

It is to be noted from Table 2 that after continuous operation for about ten days the difference between polymerization temperature $T_2$ and average temperature of fed and discharged coolant became gradually greater and it became 20° to 25° C., and at last average temperature of fed and discharged coolant came close to that of the replenishing coolant.

This means that it was impossible to continue operation any longer. The inspection after shut-down revealed that there were large lumps of polymer deposited on the surface of the jacket and coil and the shaft of the stirrer. Gel was found in the resulting ethylene-vinyl acetate copolymer.

What is claimed is:

1. An improved process for continuously producing ethylene-vinyl acetate copolymer containing 20 to 50 mole % of ethylene by solution polymerization which comprises copolymerizing ethylene and vinyl acetate in the presence of a lower aliphatic alcohol containing from 1 to 4 carbon atoms as solvent and polymerization catalyst in a polymerization vessel, wherein the improvement comprises the steps of
   (1) passing vinyl acetate or a solvent solution of vinyl acetate through a heat exchanger provided with a cooling means from the upper part thereof to the lower part thereof, and simultaneously passing ethylene vapor discharged from the polymerization vessel through said heat exchanger from the lower part thereof to the upper part thereof, so that they come into counter-current contact with each other in said heat exchanger at a temperature sufficient to condense said ethylene vapor, thereby causing the viyl acetate or the solvent solution of vinyl acetate to absorb and solubilize ethylene,
   (2) introducing the resulting vinyl acetate or solvent solution of vinyl acetate which has absorbed and solubilized ethylene therein into the polymerization vessel, and
   (3) mixing the polymerization vessel the resulting vinyl acetate or the solvent solution of vinyl acetate which has absorbed and solubilized ethylene therein with the polymerization solution, heating the polymerization solution up to the prescribed polymerization temperature, and vaporizing ethylene in excess of solubility at the polymerization temperature from the vinyl acetate or the solvent solution of vinyl acetate by the aid of the heat in the polymerization vessel, and circulating the vaporized ethylene to the heat exchanger.

2. A process for continuously producing ethylenevinyl acetate copolymer as set forth in claim 1, wherein vinyl acetate or a solvent solution of vinyl acetate is allowed to flow down in the form of a thin film in the heat exchanger provided with a cooling means.

3. A process for continuously producing ethylenevinyl acetate copolymer as set forth in claim 1, wherein vinyl acetate or a solvent solution of vinyl acetate is allowed to flow down in the form of a thin film along the internal surface of the tubes of a wetted-wall multitubular heat exchanger and a coolant is allowed to pass outside the tubes.

4. A process for continuously producing ethylene-vinyl acetate copolymer as set forth in claim 1, wherein the following inequality is established:

$$-10° \text{ C.} \leq T_1 \leq T_2 - 10° \text{ C.}$$

wherein $T_1$ is the temperature (°C.) of a vinyl acetate or a solvent solution of vinyl acetate which has absorbed and solubilized ethylene therein being introduced into the polymerization vessel; and $T_2$ is the polymerization temperature (°C.) in the polymerization vessel, said temperature being between 35° and 80° C.

5. A process for continuously producing ethylene-vinyl acetate copolymer as set forth in claim 1, wherein the solvent is methanol.

6. A process for continuously producing ethylene-vinyl acetate copolymer as set forth in claim 1, wherein the solvent is methanol, the concentration of the solvent is 1 to 30 wt % based on the total liquid in the polymerization vessel, the polymerization temperature ($T_2$) is between 35° and 80° C., the polymerization pressure is from 20 to 70 kg/cm$^2$G and the temperature ($T_1$) of a vinyl acetate or a solvent solution of vinyl acetate which has absorbed and solubilized ethylene therein is from $-10°$ C. to $T_2 - 10°$ C.

* * * * *

UNITED STATES PATENT AND TRADEMARK OFFICE
CERTIFICATE OF CORRECTION

PATENT NO.  : 4,657,994
DATED       : April 14, 1987
INVENTOR(S) : Tanaka et al

It is certified that error appears in the above-identified patent and that said Letters Patent is hereby corrected as shown below:

In Claim 1, line 25 thereof, after "mixing", insert -- in --.

Signed and Sealed this

Eighteenth Day of August, 1987

Attest:

DONALD J. QUIGG

Attesting Officer    Commissioner of Patents and Trademarks